(12) United States Patent
Biazetti et al.

(10) Patent No.: US 11,037,557 B2
(45) Date of Patent: Jun. 15, 2021

(54) COGNITIVE CONTEXTUAL CONVERSATION SIDE TOPICS

(71) Applicant: INTERNATIONAL BUSINESS MACHINES CORPORATION, Armonk, NY (US)

(72) Inventors: Ana C. Biazetti, Cary, NC (US); Igor S. Ramos, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 110 days.

(21) Appl. No.: 16/111,293

(22) Filed: Aug. 24, 2018

(65) Prior Publication Data
US 2020/0065382 A1 Feb. 27, 2020

(51) Int. Cl.
*G10L 15/22* (2006.01)
*G06F 40/30* (2020.01)

(52) U.S. Cl.
CPC .............. *G10L 15/22* (2013.01); *G06F 40/30* (2020.01)

(58) Field of Classification Search
CPC .................................. G06F 40/30; G10L 15/22
See application file for complete search history.

(56) References Cited

U.S. PATENT DOCUMENTS

| | | | | |
|---|---|---|---|---|
| 6,219,643 B1* | 4/2001 | Cohen | ............... | H04M 3/42221 704/257 |
| 9,460,155 B2 | 10/2016 | Verma | | |
| 9,544,704 B1* | 1/2017 | John | ........................ | G10L 25/54 |
| 9,812,151 B1* | 11/2017 | Amini | ...................... | G10L 15/26 |
| 2007/0043571 A1* | 2/2007 | Michelini | ............ | G10L 15/1815 704/270.1 |
| 2010/0185437 A1* | 7/2010 | Visel | ........................ | G06F 40/30 704/9 |
| 2012/0016678 A1* | 1/2012 | Gruber | .............. | H04M 1/72547 704/275 |
| 2012/0173991 A1* | 7/2012 | Roberts | ............... | G06F 3/04815 715/747 |
| 2012/0232898 A1* | 9/2012 | Di Fabbrizio | ........ | G10L 15/063 704/235 |
| 2013/0024431 A1* | 1/2013 | Parthasarathy | ..... | G06F 16/3334 707/692 |
| 2014/0009561 A1* | 1/2014 | Sutherland | ............. | F16M 11/42 348/14.05 |
| 2014/0244712 A1* | 8/2014 | Walters | ................... | H04L 67/10 709/202 |
| 2014/0279050 A1* | 9/2014 | Makar | .................... | G06N 20/00 705/14.66 |

(Continued)

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Shaun Roberts
(74) *Attorney, Agent, or Firm* — Robert D. Bean

(57) ABSTRACT

According to one embodiment, a method, computer system, and computer program product for natural language machine-man interfacing is provided. The present invention may include, in response to a user interaction, based on contextual information, presenting, by a computer, a side topic to a user, wherein the side topic is a topic of conversation that is tangentially related to a goal of the user interaction.

17 Claims, 5 Drawing Sheets

(56) References Cited

U.S. PATENT DOCUMENTS

| | | | | |
|---|---|---|---|---|
| 2015/0169336 | A1* | 6/2015 | Harper | G06F 9/453 715/706 |
| 2015/0213800 | A1* | 7/2015 | Krishnan | H04M 3/4936 704/246 |
| 2016/0098393 | A1* | 4/2016 | Hebert | G06F 40/40 704/9 |
| 2016/0104486 | A1* | 4/2016 | Penilla | G10L 15/005 704/232 |
| 2016/0110347 | A1* | 4/2016 | Kennewick, Jr. | G06F 40/40 704/9 |
| 2016/0110422 | A1* | 4/2016 | Roytman | H04M 3/5166 706/12 |
| 2016/0342317 | A1* | 11/2016 | Lim | G10L 15/22 |
| 2016/0379106 | A1* | 12/2016 | Qi | G06F 16/90332 706/11 |
| 2017/0113353 | A1 | 4/2017 | Monceaux et al. | |
| 2017/0127021 | A1 | 5/2017 | Frank et al. | |
| 2017/0148434 | A1* | 5/2017 | Monceaux | B25J 11/0015 |
| 2017/0162197 | A1* | 6/2017 | Cohen | G06F 3/167 |
| 2018/0108343 | A1* | 4/2018 | Stevans | G10L 15/22 |
| 2018/0144743 | A1* | 5/2018 | Aggarwal | G10L 15/22 |
| 2018/0211659 | A1* | 7/2018 | Segal | G06F 3/167 |
| 2019/0198016 | A1* | 6/2019 | McKenzie | G10L 15/19 |
| 2019/0318004 | A1* | 10/2019 | Rohatgi | G06F 7/08 |

OTHER PUBLICATIONS

Kobielus, "IBM Watson and the power of conversation in the cognitive fabric", IBM Big Data & Analytics Hub, Jun. 26, 2014, 2 pages.

Park et al., "Mood and Weather: Feeling the Heat?", Proceedings of the Seventh International AAAI Conference on Weblogs and Social Media, 2013, pp. 709-712.

Loewen, Effects of Weather on Human Emotions, HealthGuidance for Better Health, Nov. 2008, 6 pages, https://www.healthguidance.org/entry/15843/1/Effects-of-Weather-on-Human-Emotions.html.

Lerner et al., "Emotion and Decision Making", Manuscript submitted for publication in the Annual Review of Psychology, Draft Date: Jun. 16, 2014, pp. 1-45.

Amazon, "Help & Customer Service", printed on Aug. 13, 2018, 2 pages, https://www.amazon.com/gp/help/customer/display.html.

The Weather Company, "Weather in Cognitive Solutions with Watson", Webinar, printed on Aug. 14, 2018, https://business.weather.com/resource/webinar-weather-in-cognitive-solutions-with-watson.

English Club, "Small Talk: Conversation Starters", printed on Aug. 14, 2018, 2 pages, https://www.englishclub.com/speaking/small-talk_conversation-starters.htm.

\* cited by examiner

COGNITIVE CONTEXTUAL CONVERSATION SIDE TOPICS

BACKGROUND

The present invention relates, generally, to the field of computing, and more particularly to natural language processing.

Natural language processing is a field of computing concerned with in-context interactions between computers and humans using natural languages. As computing power has become cheaper, faster, and more powerful, many companies are rushing to develop personal assistants capable of communicating with humans using natural language for phones, tablets, computer operating systems and even purpose-built home automation appliances to provide intuitive machine-man interfacing. As such, the field of natural language processing has massively grown in relevance and sophistication in recent years, and streamlining the process is of immense commercial importance.

SUMMARY

According to one embodiment, a method, computer system, and computer program product for natural language machine-man interfacing is provided. The present invention may include, in response to a user interaction, based on contextual information, presenting, by a computer, a side topic to a user, wherein the side topic is a topic of conversation that is tangentially related to a goal of the user interaction.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
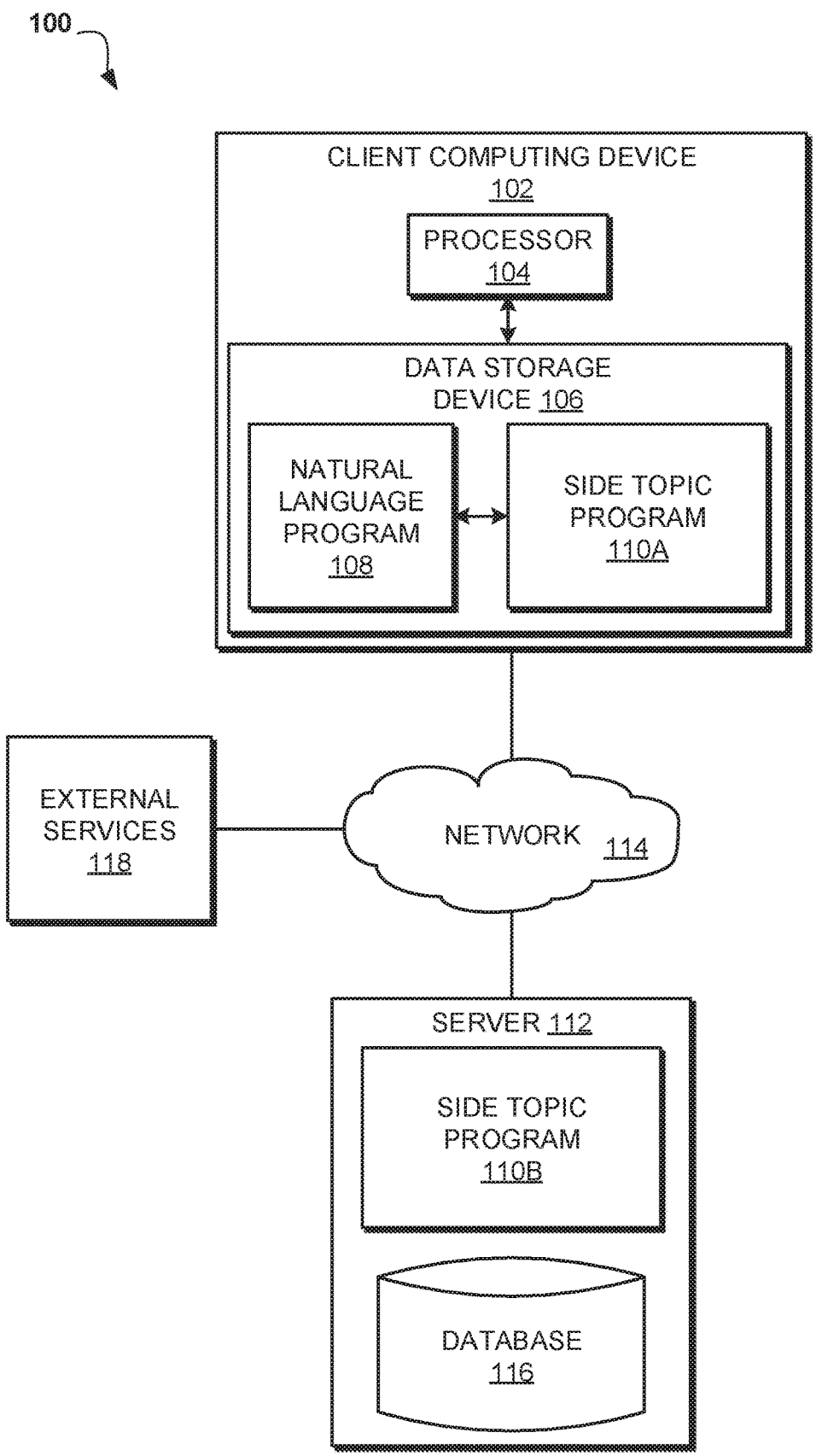
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to natural language processing. The following described exemplary embodiments provide a system, method, and program product to, among other things, combines cognitive sentiment analysis with contextual information to create rapport and engagement with users via small talk in a variety of scenarios. Therefore, the present embodiment has the capacity to improve the technical field of natural language processing by introducing side topics to natural language machine-man interactions, which add complexity and authenticity to machine-man interactions beyond direct requests and responses, making communication more natural and comfortable to a user. The embodiment further allows a natural language processing system to determine the mood, needs, and interests of a user, allows contextual data to be presented to the user, allows a rapport to be built between the natural language assistant and the user, and provides advertising opportunities that are more context sensitive.

As previously described, natural language processing is a field of computing concerned with in-context interactions between computers and humans using natural languages. As computing power has become cheaper, faster, and more powerful, many companies are rushing to develop personal assistants capable of communicating with humans using natural language for phones, tablets, computer operating systems and even purpose-built home automation appliances to provide intuitive machine-man interfacing. As such, the field of natural language processing has massively grown in relevance and sophistication in recent years, and streamlining the process is of immense commercial importance.

With the advent of voice-based virtual assistants, such as Google Home® (Google Home® and all Google Home®-based trademarks and logos are trademarks or registered trademarks of Google Inc. and/or its affiliates), Amazon Echo® (Amazon Echo® and all Amazon Echo®-based trademarks and logos are trademarks or registered trademarks of Amazon Technologies, Inc. and/or its affiliates), and Ski® (Siri® and all Siri®-based trademarks and logos are trademarks or registered trademarks of Apple Inc. and/or its affiliates), people have become accustomed to engaging in conversations with computer systems to accomplish tasks, such as changing temperature, turning on lights, fetching information on the weather, playing music, and more. One step up from simple commands is the use of natural language to convey an intent. An end-user may say "it's a bit too dark in here," and a cognitive system may determine a user's intent to turn on the lights. In a further stage of interaction, a machine may make seamless and relevant recommendations based on context, but not necessarily as a response to a user's request. Most natural-language based assistants converse with users in very direct fashion, by listening for commands or queries and supplying pre-defined answers. In such a situation, conversations consist of very little back-and-forth, and are usually very specific and objective-based. As a result, users do not easily connect with natural language based assistants, and tend to be reserved when they encounter ads based on their web surfing history, or when shown options recommended by a personal assistant. Even those natural language based assistants that are capable of inference are usually unable to deviate from the question-answer format and provide natural conversation. As such, it may be advantageous to, among other things, implement a system that uses a mixture of contextual data and cognitive sentiment analysis to engage a user in casual side topics not aligned with the primary purpose of the conversation with the user, in order to build trust and rapport between the human and machine, identify end user's needs and strengthen a user preference profile, and to present to the user, in a seamless, non-disruptive way, relevant recommendations; by engaging in casual conversation with a user about informal topics, and taking emotions into account in an attempt to make the user feel good, the system may make users happier, more comfortable, and more likely to accept recommendations, thereby improving the chances of goal conversion such as product up-selling and cross-selling, or partner referral.

According to one embodiment, the invention may be a method of combining cognitive technology (personality insights) with contextual data such as current weather, sports, or news data to engage in "side topics," which are casual, informal 'small talk' type interactions which are not necessarily aligned with the primary purpose of the communication initiated by the user. The side topic interactions are not direct or specific, but are rather more generic to leave the space open for additional small talk with the user, and to thereby encourage the conversation to naturally develop in directions that may provide insight into the needs, emotions, and interests of the user. Based on information gathered in conversation with a user, the system may determine the best time and situation to offer options which may affect consumer behavior in a form that is natural and unintrusive. For example, a user interacting with a side-topics-method-utilizing natural language assistant to order a pizza may go like this:

User: "Hi there!"
Machine: "Hello there, how are you doing this lovely evening? It's seventy degrees and not a cloud in the sky! How nice.
User: "Yes, it's so nice I am going to a picnic with my wife! What pizza do you recommend?"
Machine: "Our most popular is the pepperoni with olives. How does that sound?"
User: "Great. I'll order one!"
Machine: "Alright, let me put that order in for you. By the way, picnic and wine go together well. It would make for a romantic sunset with your wife."
User: "I love that idea, but I don't think the park district allows alcohol."
Machine: Yes, they do allow alcohol. I just checked their website for you."
User: "Excellent, give me the pizza and wine."

In this example, the machine uses weather as a side topic. The user responds naturally, responding with how the weather is impacting his life. The machine uses this information to formulate a response based on the facts of the user's response, namely that he is going to a picnic with his wife, by recommending wine. The wine recommendation is not related to the user's main goal in initiating the interaction with the machine, namely, ordering a pizza; but through the conversation based on the side topic, the machine found wine to be relevant to the user's situation, and as such, was able to make a recommendation which was successfully taken up by the user.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to combines cognitive sentiment analysis with contextual information to create rapport and engagement with users via small talk in a variety of scenarios.

Referring to FIG. 1, an exemplary networked computer environment 100 is depicted, according to at least one embodiment. The networked computer environment 100 may include a client computing device 102 and a server 112 interconnected via a communication network 114. According to at least one implementation, the networked computer environment 100 may include a plurality of the client computing devices 102 and the servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 102 may include a processor 104 and a data storage device 106 that is enabled to host and run a natural language program 108 and a side topic program 110A and communicate with the server 112 via the communication network 114, in accordance with one embodiment of the invention. The client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 3, the client computing device 102 may include an internal components 302a and an external components 304a, respectively.

The server computer 112 may be a laptop computer, netbook computer, personal computer (PC), a desktop computer, or any programmable electronic device or any network of programmable electronic devices capable of hosting and running a side topic program 110B and a database 116 and communicating with the client computing device 102 via the communication network 114, in accordance with embodiments of the invention. As will be discussed with reference to FIG. 3, the server computer 112 may include an internal components 302b and an external components 304b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

A natural language program 108 may be any computer program or combinations of computer programs capable of accepting natural language, including text and/or audible speech, as an input, and processing natural language into a state that is computer-readable, and may further be capable of performing actions or serving requests derived from the natural language input, such as answering queries or responding to remarks. Natural language program 108 need not necessarily be located on computing device 102; natural language program 108 may be located anywhere within communication of the voice authentication program 110, such as on computing device 102 or on any other device located within network 114. Furthermore, natural language program 108 may be distributed in its operation over multiple devices, such as multiple different computing devices 102.

According to the present embodiment, the side topic program 110A, 110B may be a program capable of combines cognitive sentiment analysis with contextual information to create rapport and engagement with users via small talk in a variety of scenarios. The side topic method is explained in further detail below with respect to FIG. 2. The side topic program 110A, 110B may be a discrete program or it may be a subroutine or method integrated into natural language program 108. The side topic program 110A, 110B may be located on computing device 102 or on any device located within network 114. Furthermore, voice authentication program 110 may be distributed in its operation over multiple devices, such as multiple client computing devices 102.

External services 118 may be any services capable of providing contextual and/or user information to side topic program 110A, 110B. External services may, for example, include advanced programming interfaces (APIs) capable of accessing and manipulating data pertaining to various contextually relevant sources, such as news, weather, sports, movies, etc.

Figure 2:
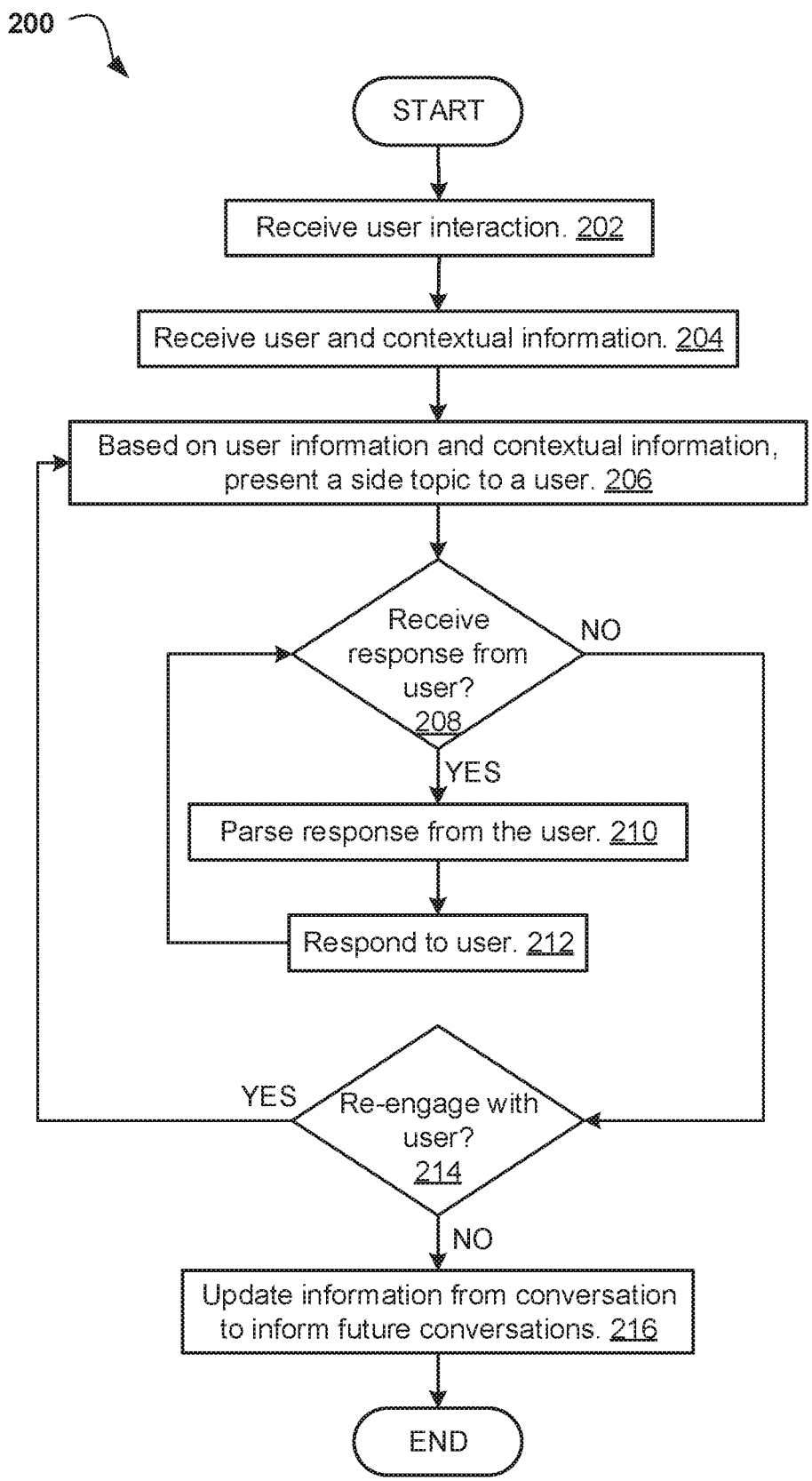
FIG. 2 is an operational flowchart illustrating a side topic process according to at least one embodiment.

Referring now to FIG. 2, an operational flowchart illustrating a side topic process 200 is depicted according to at least one embodiment. At 202, the side topic program 110A, 110B receives a user interaction, either from natural language program 108, directly over network 114, or from sensors or interface devices in communication with side topic program 110A, 110B. This user interaction may be a question or command, or, in some embodiments, may merely be small talk with no defined objective.

At 204, side topic program 110A, 110B receives user and contextual information. The user information may be any information about the user interacting with side topic program 110A, 110B, including geographical location, past history, past moods, past conversations with side topic program 110A, 110B, favorite sports teams, favorite weather, past movies or genre of movies the user has enjoyed, favorite foods, and any other information that might be relevant to formulating side topics. User information may also be inferred; for example, users calling a pizza restaurant may be inferred to live close to that pizza shop. In some embodiments, such as where side topic program 110A, 110B is employed in an automated phone system for a restaurant or other context where there are many users and not many repeat customers, user information may not be received, and/or may not be stored long term, but may only be learned or inferred directly from the user in the course of the conversation. The contextual information may be any information that may be employed in formulating and presenting side topics to a user. For instance, current events, sports news, recent or upcoming movies, interesting facts, or weather may all be suitable topics for side topics. Other information such as news media, social media, etc. may be contextual information as they are relevant to both the subject and selection of side topics. Contextual information may be more effective for formulating side topics when it is highly localized in the region of the user, or otherwise tailored to be as relevant as possible to the user. User information and contextual information may be obtained via external services 118, or by any other means.

At 206, based on user information and contextual information, side topic program 110A, 110B presents a side topic to a user. The side topics may be conversation topics that are informal and not necessarily aligned with the user's primary goal in engaging with side topic program 110A, 110B. The side topic's subject matter may be drawn from the contextual information, and the particular topic for the side topic may be selected based on the user information; for instance, user's favorite sports team won or lost a game, side topic program 110A, 110B may mention the event. The side topic program 110A, 110B may comment on weather that the user historically has liked, new movie in a genre the user likes, significant news event in the user's area, etc. The topics may also be based on the amount of user information available; if there is little or no user information available, side topic program 110A, 110B may prioritize safe topics like the weather, traffic conditions, news events, etc. In some embodiments of the invention, side topic program 110A, 110B may rank potential side topics by relevance to a user's interests, and select the highest ranking to present to the user. The side topic program 110A, 110B may also select or rank side topics based in whole or in part on the commercial value of recommendations relevant to a given side topic, and/or by success of particular side topics in past conversations in particular contexts. Additionally, side topic program 110A, 110B may use social media, news, and events to help identify popular subjects for side topics.

Then, at 208, the side topic program 110A, 110B determines whether side topic program 110A, 110B has received a response from the user. According to one implementation, if the side topic program 110A, 110B has received a response from the user (step 208, "YES" branch), the side topic program 110A, 110B may continue to step 210 to parse the response of the user. If the side topic program 110A, 110B determines that side topic program 110A, 110B has not received a response from the user (step 208, "NO" branch), the side topic program 110A, 110B may continue to step 214 to determine whether to re-engage with the user.

At 210, side topic program 110A, 110B parses the response from the user. The side topic program 110A, 110B may parse the response of the user by utilizing cognitive semantic analysis to process the different parts of the interaction; for instance, side topic program 110A, 110B may parse the response to extract the intent of the user, to extract facts or infer facts, and to extract the user's emotion in the response.

At 212, side topic program 110A, 110B responds to the user. The side topic program 110A, 110B may respond to the user by, for instance, looking up a list of pre-programmed responses in a database based on any number of relevant factors, such as the mood, facts, content, and/or context of the user's response. For instance, if the user's response, as in the earlier example, involves a positive event, with spouse, is romantic, etc. side topic program 110A, 110B may choose a response that is relevant to those factors, such as by recommending wine. If the user is discussing a sad topic, side topic program 110A, 110B may choose a response that is equally somber, or is happy in an attempt to cheer up the user. The side topic program 110A, 110B may make recommendations to the user based on the user's response; these recommendations may be for activities or locations, or for products, services, vendors, or any other relevant subject, commercial or non-commercial. In the event that no relevant response is found, side topic program 110A, 110B may utilize a generic response instead, and may flag the user response and attach relevant contextual data so that operators may add the responses at a later date and further tune the database of responses.

At 214, the side topic program 110A, 110B determines whether to re-engage with the user. The side topic program 110A, 110B may decide whether or not to re-engage the user based on a number of criteria; for instance, if the mood of the user is angry, sad, distracted, or any number of other emotions that might result in a user being unwilling to engage with side topic program 110A, 110B as parsed from the user's initial interaction or responses, side topic program 110A, 110B may decide not to re-engage the user with further side topics. Furthermore, if a predetermined threshold of side topics has already been reached, or the time elapsed between side topic program 110A, 110B's response and the user response exceeds a certain predetermined threshold or exceeds the threshold some number of times, side topic program 110A, 110B may not re-engage with the user, so as to avoid fatiguing the user. Additionally, side topic program 110A, 110B may determine not to re-engage with the user if the topic has been completed and the conversation has reached a natural endpoint. The side topic program 110A, 110B may decide to re-engage the user if the user has promptly responded to side topic program 110A, 110B, demonstrated a positive mood, or has otherwise demonstrated engagement in the conversation so far. According to one implementation, if the side topic program 110A, 110B decides to re-engage with the user (step 212, "YES" branch), the side topic program 110A, 110B may continue to step 206 to, based on user information and contextual information, present a side topic to a user. If the side topic program 110A, 110B determines not to re-engage with the user (step 212, "NO" branch), the side topic program 110A, 110B may continue to step 216 to update information from the conversation to inform future conversations.

At 216, side topic program 110A, 110B updates information from the conversation to inform future conversations. Here, side topic program 110A, 110B may save facts pertinent to the user gleaned from the conversation into the user information, and may save such information as the efficacy of certain topics, which may be measured for example by the speed of user responses, improvement in user mood, and/or praise/criticism by the user, or gaps in the database of preplanned responses, or any other information that may be useful in improving the quality and/or natural feeling of responses.

It may be appreciated that FIG. 2 provides only an illustration of one implementation and does not imply any limitations with regard to how different embodiments may be implemented. Many modifications to the depicted environments may be made based on design and implementation requirements.

Figure 3:
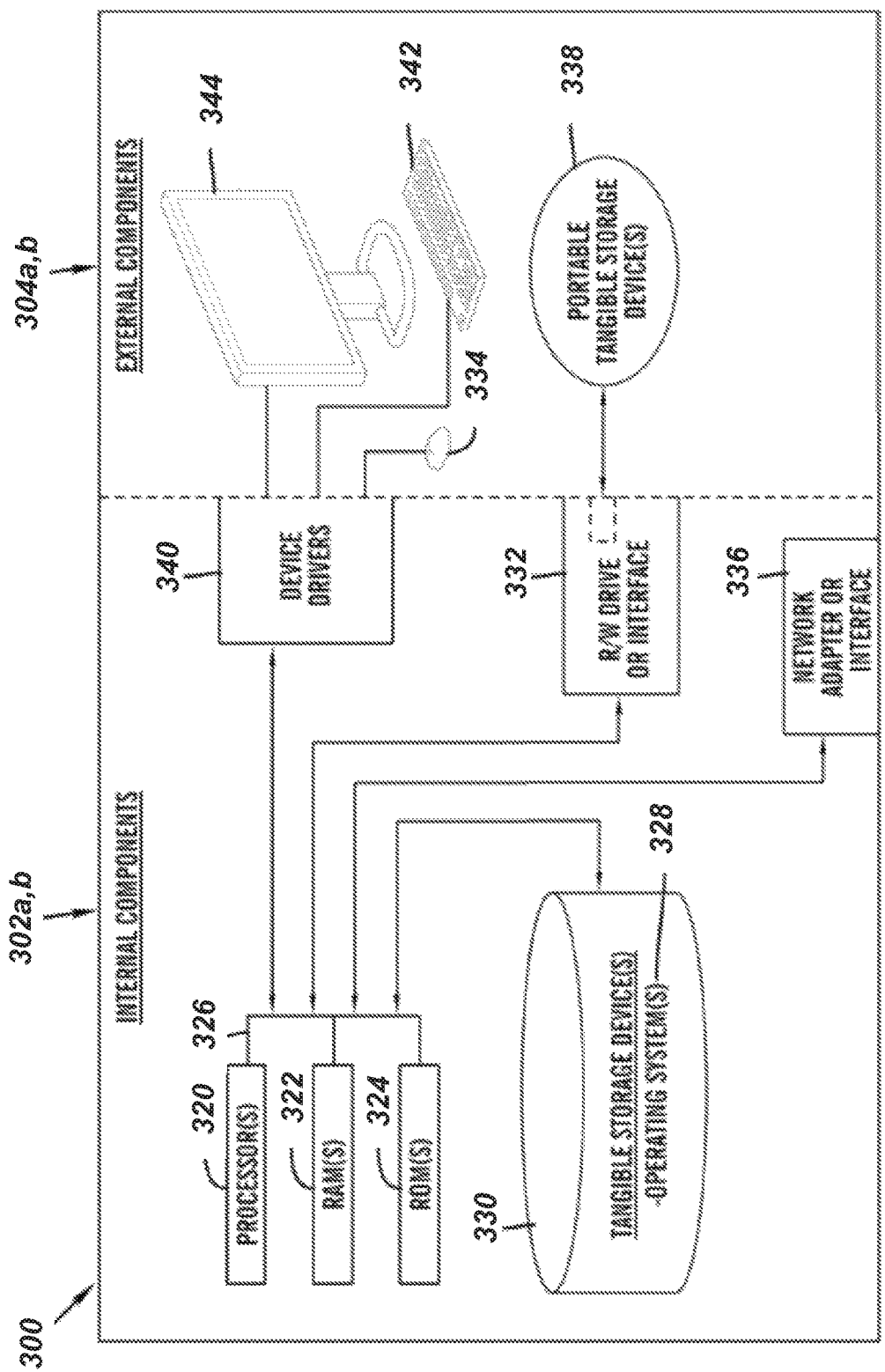
FIG. 3 is a block diagram of internal and external components of computers and servers depicted in FIG. 1 according to at least one embodiment.

FIG. 3 is a block diagram 300 of internal and external components of the client computing device 102 and the server 112 depicted in FIG. 1 in accordance with an embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

The data processing system 302, 304 is representative of any electronic device capable of executing machine-readable program instructions. The data processing system 302, 304 may be representative of a smart phone, a computer system, PDA, or other electronic devices. Examples of computing systems, environments, and/or configurations that may represented by the data processing system 302, 304 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 302 a,b and external components 304 a,b illustrated in FIG. 3. Each of the sets of internal components 302 include one or more processors 320, one or more computer-readable RAMs 322, and one or more computer-readable ROMs 324 on one or more buses 326, and one or more operating systems 328 and one or more computer-readable tangible storage devices 330. The one or more operating systems 328, the natural language program 108 and the side topic program 110A in the client computing device 102, and the side topic program 110B in the server 112 are stored on one or more of the respective computer-readable tangible storage devices 330 for execution by one or more of the respective processors 320 via one or more of the respective RAMs 322 (which typically include cache memory). In the embodiment illustrated in FIG. 3, each of the computer-readable tangible storage devices 330 is a magnetic disk storage device of an internal hard drive. Alternatively, each of the computer-readable tangible storage devices 330 is a semiconductor storage device such as ROM 324, EPROM, flash memory or any other computer-readable tangible storage device that can store a computer program and digital information.

Each set of internal components 302 a,b also includes a R/W drive or interface 332 to read from and write to one or more portable computer-readable tangible storage devices 338 such as a CD-ROM, DVD, memory stick, magnetic tape, magnetic disk, optical disk or semiconductor storage device. A software program, such as the side topic program 110A, 110B, can be stored on one or more of the respective portable computer-readable tangible storage devices 338, read via the respective R/W drive or interface 332, and loaded into the respective hard drive 330.

Each set of internal components 302 a,b also includes network adapters or interfaces 336 such as a TCP/IP adapter cards, wireless Wi-Fi interface cards, or 3G or 4G wireless interface cards or other wired or wireless communication links. The natural language program 108 and the side topic program 110A in the client computing device 102 and the side topic program 110B in the server 112 can be downloaded to the client computing device 102 and the server 112 from an external computer via a network (for example, the Internet, a local area network or other, wide area network) and respective network adapters or interfaces 336. From the network adapters or interfaces 336, the natural language program 108 and the side topic program 110A in the client computing device 102 and the side topic program 110B in the server 112 are loaded into the respective hard drive 330. The network may comprise copper wires, optical fibers, wireless transmission, routers, firewalls, switches, gateway computers and/or edge servers.

Each of the sets of external components 304 a,b can include a computer display monitor 344, a keyboard 342, and a computer mouse 334. External components 304 a,b can also include touch screens, virtual keyboards, touch pads, pointing devices, and other human interface devices. Each of the sets of internal components 302 a,b also includes device drivers 340 to interface to computer display monitor 344, keyboard 342, and computer mouse 334. The device drivers 340, R/W drive or interface 332, and network adapter or interface 336 comprise hardware and software (stored in storage device 330 and/or ROM 324).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
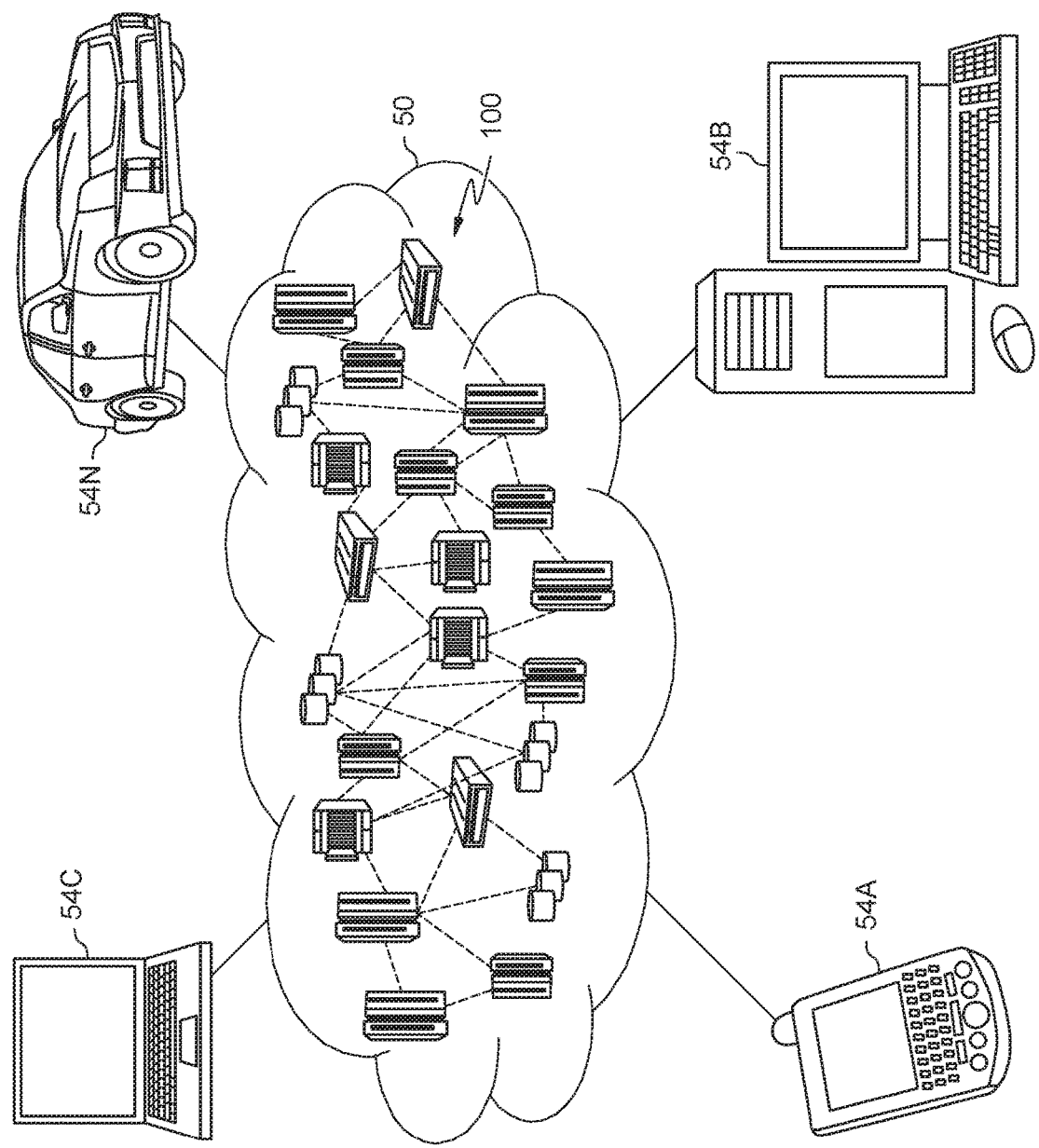
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
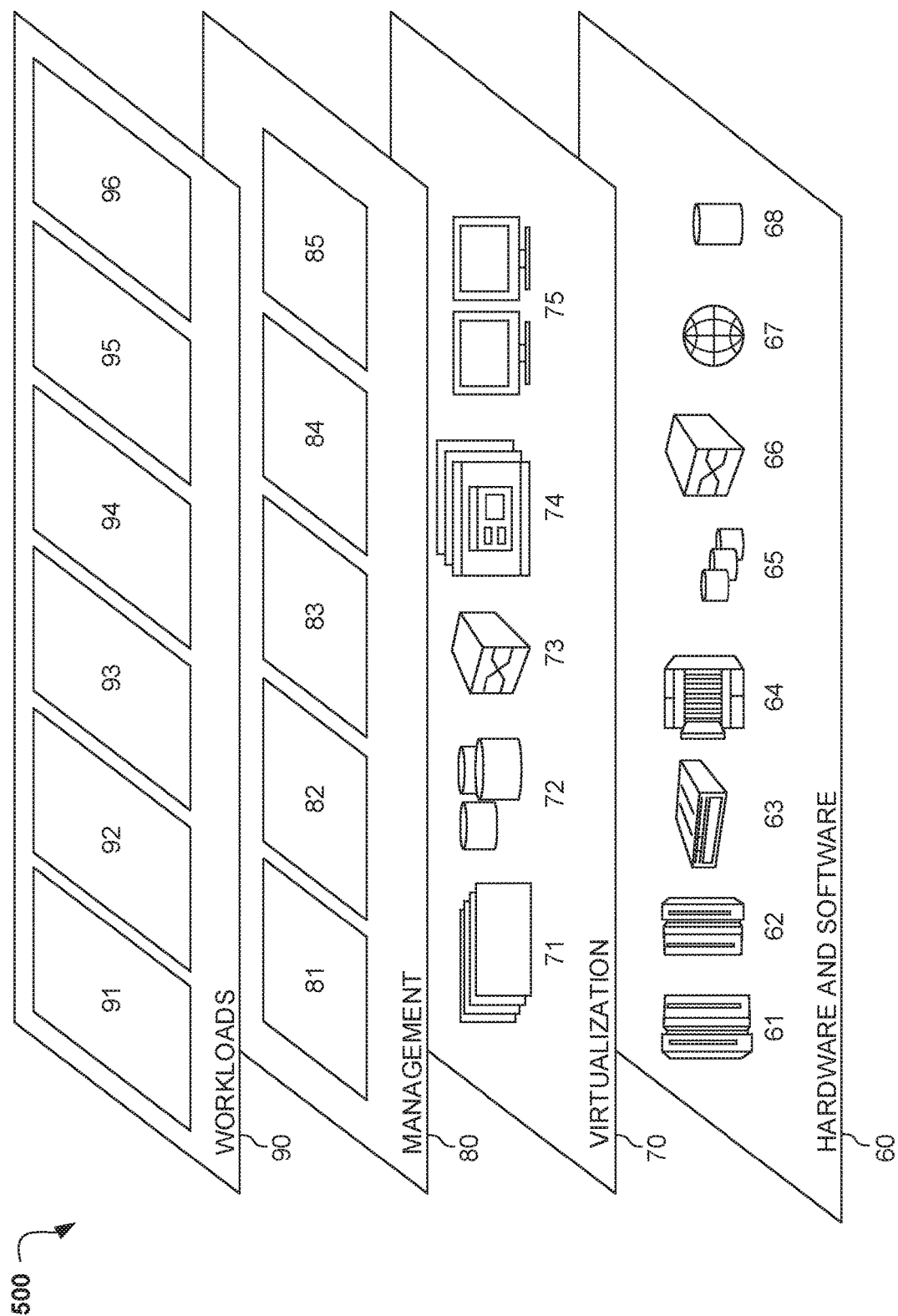
FIG. 5 depicts abstraction model layers according to an embodiment of the present invention.

Referring now to FIG. 5, a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and side topic generation 96. Side topic generation 96 may relate to combining cognitive sentiment analysis with contextual information to create rapport and engagement with users via small talk in a variety of scenarios.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for natural language machine-man interfacing, the method comprising:
in response to a user interaction, based on contextual information, engaging, by a computer, in small talk, wherein small talk is a conversation with a user about a side topic, wherein the side topic is a non-directed topic of conversation that is unrelated to a goal of the user interaction, and wherein the side topic is selected from a plurality of potential side topics ranked by relevance to a user's interests; and
presenting, by the computer, one or more recommendations to the user based on information gathered from one or more user remarks made during and responsive to the conversation about the side topic; and
and responsive to determining that the small talk exceeds a threshold number of side topics, concluding the small talk.

2. The method of claim 1, wherein the conversation based on the side topic comprises a comment that is formulated from data that is relevant to the user.

3. The method of claim 1, wherein the side topic is chosen based on at least one factor selected from the group consisting of:
the amount of user information available, commercial value of recommendations, popularity of a topic, and past success of a topic.

4. The method of claim 1, wherein a number of side topics presented to the user is limited by at least one means selected from the group consisting of:
a predetermined limit, a mood of the user, and an engagement of the user.

5. The method of claim 1, wherein the side topic is chosen based on at least one past conversation with the user.

6. The method of claim 1, wherein the side topic is chosen based on a popularity of one or more potential side topics within a plurality of social media.

7. A computer system for natural language machine-man interfacing, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
in response to a user interaction, based on contextual information, engaging, by a computer, in small talk, wherein small talk is a conversation with a user about a side topic, wherein the side topic is a non-directed topic of conversation that is unrelated to a goal of the user interaction, and wherein the side topic is selected from a plurality of potential side topics ranked by relevance to a user's interests; and
presenting, by the computer, one or more recommendations to the user based on information gathered from one or more user remarks made during and responsive to the conversation about the side topic; and
and responsive to determining that the small talk exceeds a threshold number of side topics, concluding the small talk.

8. The computer system of claim 7, wherein the conversation about the side topic comprises a comment that is formulated from data that is relevant to the user.

9. The computer system of claim 7, wherein the side topic is chosen based on at least one factor selected from the group consisting of:
the amount of user information available, commercial value of recommendations, popularity of a topic, and past success of a topic.

10. The computer system of claim 7, wherein a number of side topics presented to the user is limited by at least one means selected from the group consisting of:
a predetermined limit, a mood of the user, and an engagement of the user.

11. The computer system of claim 7, wherein the side topic is chosen based on at least one past conversation with the user.

12. The computer system of claim 7, wherein the side topic is chosen based on a popularity of one or more potential side topics within a plurality of social media.

13. A computer program product for natural language machine-man interfacing, the computer program product comprising:
one or more computer-readable tangible storage medium and program instructions stored on at least one of the one or more tangible storage medium, the program instructions executable by a processor to cause the processor to perform a method comprising:
in response to a user interaction, based on contextual information, engaging, by a computer, in small talk, wherein small talk is a conversation with a user about a side topic, wherein the side topic is a non-directed topic of conversation that is unrelated to a goal of the user interaction, and wherein the side topic is selected from a plurality of potential side topics ranked by relevance to a user's interests; and presenting, by the computer, one or more recommendations to the user based on information gathered from one or more user remarks made during and responsive to the conversation about the side topic; and responsive to determining that the small talk exceeds a threshold number of side topics, concluding the small talk.

14. The computer program product of claim 13, wherein the conversation about the side topic comprises a comment that is formulated from data that is relevant to the user.

15. The computer program product of claim 13, wherein the side topic is chosen based on at least one factor selected from the group consisting of:
the amount of user information available, commercial value of recommendations, popularity of a topic, and past success of a topic.

16. The computer program product of claim 13, wherein a number of side topics presented to the user is limited by at least one means selected from the group consisting of:
a predetermined limit, a mood of the user, and an engagement of the user.

17. The computer program product of claim 13, wherein the side topic is chosen based on at least one past conversation with the user.

* * * * *